United States Patent [19]

Meier et al.

[11] 3,868,236

[45] Feb. 25, 1975

[54] CENTRIFUGAL GAS-LIQUID SEPARATOR

[75] Inventors: Franz Meier, Oberhausen-Sterkrade; Erich Ossendorf, Bochum; Hubert Wolfgarten, Oberhausen-Sterkrade, all of Germany

[73] Assignee: Gutehoffnungshutte Sterkrade Aktiengesellschaft, Oberhausen-Sterkrade, Germany

[22] Filed: Jan. 24, 1974

[21] Appl. No.: 436,206

Related U.S. Application Data

[63] Continuation-in-part of Ser. No. 195,924, Nov. 5, 1971, abandoned.

[30] Foreign Application Priority Data

Nov. 17, 1970 Germany............................ 2056388

[52] U.S. Cl.............................. 55/203, 55/DIG. 22
[51] Int. Cl...................... B01d 45/12, B01d 53/24
[58] Field of Search ........................ 55/52, 184–185, 55/199–203

[56] References Cited
UNITED STATES PATENTS

| | | | |
|---|---|---|---|
| 1,930,476 | 10/1933 | Hawley | 55/DIG. 22 |
| 2,106,589 | 1/1938 | Bigger et al. | 55/185 X |
| 2,512,938 | 6/1950 | Henszey | 55/447 X |
| 3,296,779 | 1/1967 | Daman et al. | 55/337 |

Primary Examiner—Samih N. Zaharna
Assistant Examiner—Richard W. Burks
Attorney, Agent, or Firm—Toren, McGeady & Stanger

[57] ABSTRACT

A vapor-liquid separator includes an annular bladed section defining laterally open channels through which the vapor-liquid mixture flows and vertically directed gas flow channels through which the separated vapor flows. An outer discharge jacket receiving the liquid extends to above the annular bladed section and includes an insert for narrowing a portion of the liquid flow path and fins for deflecting the liquid from the centrifugal flow path, imparted by the bladed section, into a downwardly directed vertical flow path, thereby to avoid splatter during discharge. A baffle plate located in a gas discharge flow pipe arranged above the bladed section serves to provide additional gas drying.

8 Claims, 4 Drawing Figures

3,868,236

CENTRIFUGAL GAS-LIQUID SEPARATOR

This is a Continuation-In-Part of copending Application Ser. No. 195,924 filed Nov. 5, 1971 and now abandoned.

BACKGROUND OF THE INVENTION

The invention relates generally to gas-liquid separators, and more particularly to separators which comprise a bladed section wherein separation is effected and wherein a centrifugal or rotational component of flow is imparted. The separator of the present invention is primarily useful in connection with separation of water and steam, although other applications are contemplated.

In known devices of this kind, liquid is forced by centrifugal motion produced in the bladed section against the wall of an outer discharge jacket in the form of a rotational paraboloid. The steam or gas to be separated escapes from the center of the paraboloid and, accordingly, after their separation the gas and liquid are discharged along a common path for a portion of their flow. Gas which is entrained downwardly can escape upwardly through passage channels.

It is an object of the present invention to improve the degree of separation of the liquid from the gas and to avoid renewed mixing of the separated media. It is a further object of the invention to effect discharge of the separated liquid in a specific, controlled direction.

These and other objects of the invention are effected in a separator of the type described by closing off the liquid flow path defined within the outer discharge jacket directly or shortly above the bladed section, by providing fins within the outer jacket for deflection of the liquid, and by constricting the cross-section of the lower part of the outer jacket thereby to narrow the liquid flow path along a portion thereof.

SUMMARY OF THE INVENTION

Briefly, the present invention may be described as a centrifugal gas-liquid separator comprising riser means for conducting a gas-liquid mixture into the separator, an annular bladed section into which the gas-liquid mixture flows from the riser means, an outer discharge jacket circumferentially surrounding the bladed section and defining an enclosure which extends from proximately above the bladed section, and a gas discharge pipe disposed above the bladed section.

The bladed section comprises blades which are arranged to define lateral flow channels for directing the vapor-liquid mixture into the outer jacket and vertical gas channels for discharging gas upwardly into the gas discharge pipe.

At the lower part of the discharge jacket, a portion of the liquid flow path is narrowed by a constricting insert mounted therein. Furthermore, fins are provided adjacent the liquid outlet of the jacket to deflect the liquid flow from the rotational path imparted thereto by the bladed section into a downwardly directed vertical path.

In the device according to the invention, when the vapor-liquid flows through the laterally directed channels, a centrifugal flow pattern is imparted thereto causing separation of the vapor which subsequently re-enters the bladed section through the vertical gas channels. All of the separated gas is discharged through the vertical gas channels formed in the bladed section into the connecting gas discharge pipe, without coming in contact again with the liquid in its path. In the discharge jacket, which is closed at the top, the liquid from the bladed section is conducted downwardly, and the fins located in the discharge jacket impose a vertical direction of flow to the liquid passing therethrough. Thus, the gas and liquid are discharged after their separation on separate paths. The constriction in the discharge jacket imparts to the gas an increased flow resistance, such that the gas passes off in the desired manner.

In accordance with further features of the invention, the fins may be located in the constricted or narrowed cross-section of the discharge jacket, and the outlet aperture of the jacket may be designed as a siphon.

By a further aspect of the invention, it is favorable to arrange in the gas path above the gas discharge pipe a dryer, which may consist of a baffle plate with a circumferential trough from which discharge pipes may extend, said discharge pipes being supported by attachment to the exterior of the gas discharge pipe.

The various features of novelty which characterizes the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENT

Figure 1:
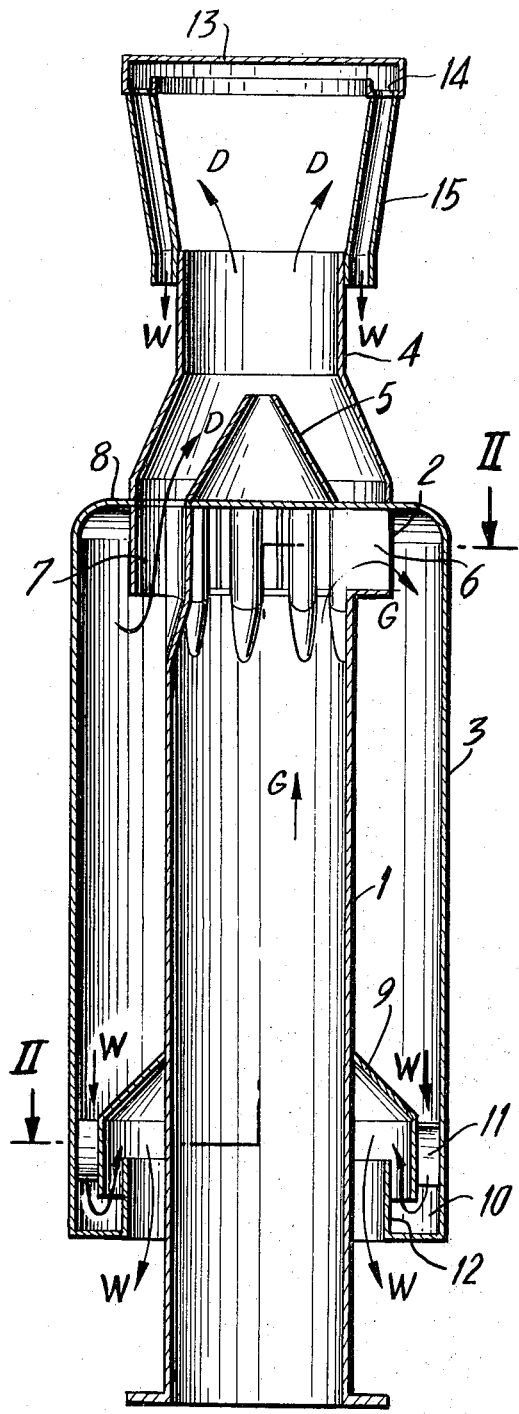
FIG. 1 is a sectional elevation showing a separator according to the invention.

The illustrated separator is connected to the vaporization zone of a steam generator and comprises a riser 1, closed at the top, which carries at its upper end annular bladed means such as a bladed section 2. The bladed section 2 and the riser 1 are circumferentially surrounded by a discharge jacket 3, and a gas discharge pipe 4, which conveys the steam into a steam receiving zone, is arranged about the bladed section 2. For better steam conduction a cone 5 is placed above the bladed section 2.

Figure 2:
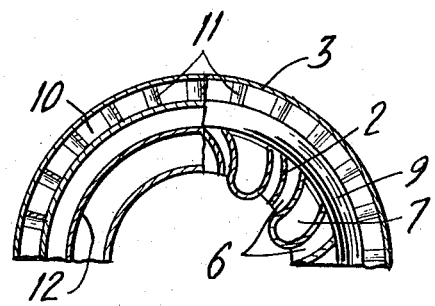
FIG. 2 is a sectional view taken along the line II—II of FIG. 1.
Figure 3:
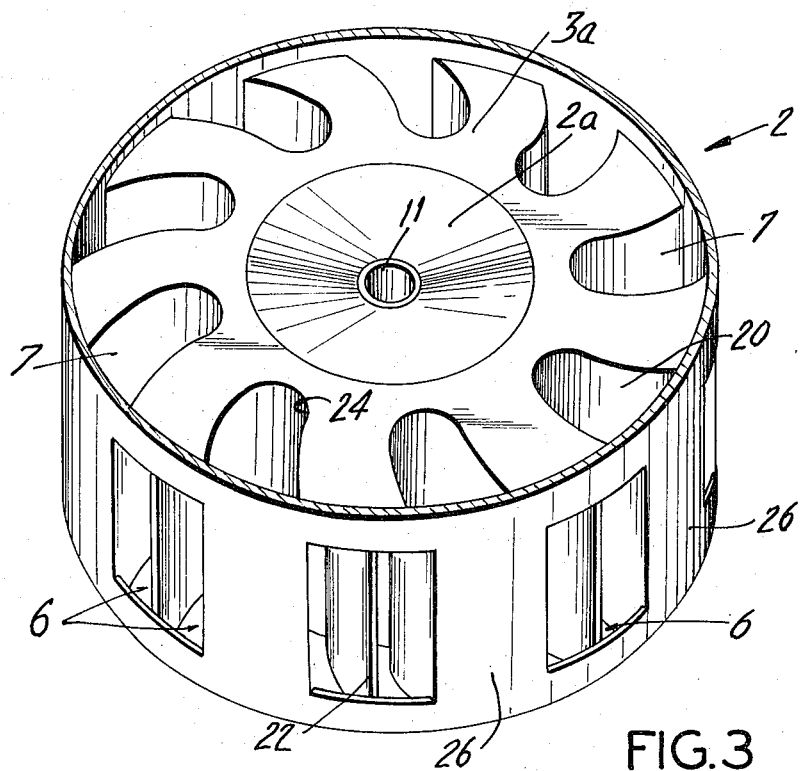
FIG. 3 is a perspective view from above of the annular bladed section shown in FIG. 2.
Figure 4:
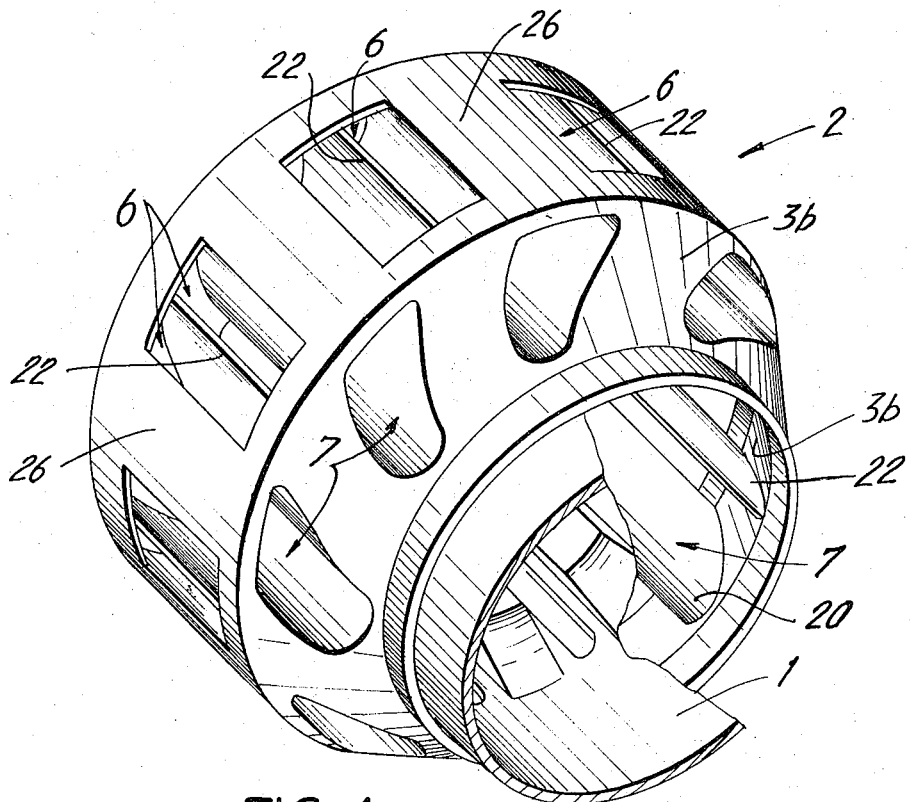
FIG. 4 is a perspective view from below of the annular bladed section of FIG. 3.

The bladed section 2 comprises laterally open liquid discharge channels 6, which are closed at the top and bottom. Between these liquid discharge channels 6, gas discharge channels 7, which traverse the bladed section 2 in an axial direction, are provided. The gas discharge channels 7 are formed by two adjacent blades which are connected together to form a closed circumferential path. Although the specific configuration of the gas passage channels depicted is preferred in that it has proved particularly favorable, other forms are conceivable without departure from the scope of the present invention. More particularly, and shown in FIGS. 2, 3 and 4, the bladed section 2 is an annularly shaped member, though when viewed in FIG. 3 it appears to be closed at its top surface because of the plate 2a. The bladed section 2 is made up of an annular horizontally arranged top plate 3a, an annular horizontally arranged bottom plate 3b, a plurality of laterally spaced blades 20, 22 extending between the top plate and the bottom plate and also extending in the radial direction of the riser from the inner to the outer edges of the plates. Panels 24 connect the radially inner edges of the blades 20 and panels 26 connect the radially outer edges of the same blades. The blades are arranged so that one blade 22 is positioned between adjacent pairs of blades 20, or in other words the blades 20 and 22 are arranged in a continuous pattern of two blades 20 and one blade 22 around the annular bladed section.

From the drawing, it can be noted that the annular bladed section constitutes two sets of passageways, the first being the vertically open gas discharge channels 7 formed between adjacent blades 20, and the second being the laterally open channels 6 formed between the blade 22 and the adjacent blades 20. The pattern of the passageways around the bladed section is such that there is one gas channel 7, two liquid channels 6, one gas channel 7, two liquid channels 6, and so on. The top plate 3a and the bottom plate 3b have openings aligned with the channels 7 so that the channels 7 extend upwardly through the bladed section while the top and bottom plates close off the upper and lower sides of the channels 6 so that these passageways extend in a radial direction, that is, normally to the direction of the channels 7.

According to the invention, the jacket 3 extends just over the bladed section 2 and is tightly closed by the end section 8, which is connected with the outside of the bladed section 2. In the lower region, the cross-section of the catch jacket 3 is narrowed by inserts 9, which are preferably conically shaped, so that a narrow annular space 10 is formed. In the annular space 10, fins 11 are provided, which are arranged to deflect the direction of liquid flow and to impart thereto a vertical direction of flow. If desired, the blades or fins 11 may be disposed above the constriction formed by the inserts 9. The discharging liquid may issue either directly from the blades 11 or, as illustrated, a siphon 12 may be provided with the liquid passing therethrough as indicated by the arrows W.

A baffle plate 13 is provided in the steam path above the discharge pipe 4 to effect further drying of the steam. The baffle plate 13 has at its circumference a trough 14 to which there are connected several liquid discharge pipes 15, which are secured to the exterior of the gas discharge pipe 4 by mounting attachments located below its upper edge.

In operation, the vapor-liquid mixture from the steam generator passes upwardly through the riser pipe 1, as indicated by the arrows G, and changes direction and passes radially outwardly through the liquid-gas channels 6 and enters the intermediate space surrounding the bladed section 2. The curved shape of the blades 20 and 22 in the bladed sections imparts a rotary or swirling motion to the vapor-liquid mixture passing through the channels 6 and, due to centrifugal force, the liquid portion of the mixture is thrown against the inside wall of the collecting space so that it flows in a parabolic course in the annular space. A part of the liquid portion indicated by the arrows D rises upwardly along the inside wall of the collecting shell and is discharged directly to the exterior of the separator by means of the liquid discharge pipe 15.

While one part of the vapor separated from the liquid flows from the separator through the open upper end of the collecting shell, another part of the vapor portion is carried along by the liquid portion into the lower portion of the annular space formed between the riser pipe and the collecting shell 3 below the bladed section and from that location it passes upwardly through the gas channels 7 and above the bladed section 2 where it enters into the lower end of the discharge pipe 4. Accordingly, the vapor portion flowing upwardly through the channels 7 does not interfere with the flow of the vapor liquid mixture flowing radially outwardly through the channels 6 and an efficient arrangement of the separator is afforded.

The cross-sectional constriction effected in the catch jacket 3 by the insert 9 increases flow resistance therethrough, thereby operating to prevent steam from issuing at this point. The separated water flows off in the catch jacket 3, retaining a part of its rotational energy. The fins 11 deflect the rotational movement of the water into a vertical direction, so that the water exits from the discharge jacket in a specific, controlled direction and does not splatter. The baffle plate 13 provides for further predrying and removes portions of water that may still be present in the steam, which flows off through the pipes 15 mounted upon the exterior of the steam discharge pipes.

While a specific embodiment of the invention has been shown and described in detail to illustrate the application of the inventive principles, it will be understood that the invention may be embodied otherwise without departing from such principles.

What is claimed is:

1. A centrifugal gas-liquid separator comprising riser means for conducting a gas-liquid mixture into said separator, annular bladed means in flow communication with said riser means, outer jacket means circumferentially surrounding said annular bladed means and defining an enclosure extending about said bladed means from proximately above said bladed means and depending downwardly therefrom, gas discharge means disposed above said bladed means to extend upwardly therefrom, said bladed means comprising blades defining a plurality of laterally directed channels closed at their upper and lower extremities for discharging said gas-liquid mixture radially outwardly from said bladed means into said jacket means and blades defining a plurality of vertically directed gas channels for discharging gas upwardly into said gas discharge means, said gas and liquid channels being circumferentially juxtaposed about said annular bladed means, means located below said annular bladed means for narrowing the liquid discharge flow path within said jacket means, and fins located proximate said narrowing means within said jacket means for deflecting the flow direction of said liquid.

2. A separator according to claim 1, wherein said fins are located within the narrowed portion of said liquid discharge flow path.

3. A separator according to claim 1, wherein said means for narrowing said liquid discharge flow path comprise conically shaped insert means mounted within said jacket means.

4. A separator according to claim 3, wherein said fins extend radially between said conically shaped insert means and said outer jacket means in a circumferentially spaced arrangement.

5. A separator according to claim 1, wherein said bladed means are arranged to impart a centrifugal flow path to said gas-liquid mixture discharging into said outer jacket, and wherein said fins are arranged to deflect separated liquid from said centrifugal flow path into a downwardly directed vertical flow path.

6. A separator according to claim 1, wherein said gas discharge means include dryer means located to receive gas discharged from said bladed means.

7. A separator according to claim 6, wherein said dryer means comprise a baffle plate defining an outer trough, with liquid discharge pipes extending in flow communication from said trough, said pipes being supported by mounting attachments to the exterior of said gas discharge means.

8. A separator according to claim 1, wherein the liquid outlet from said outer jacket means comprises a siphon.

* * * * *